United States Patent [19]
Hashimoto

[11] Patent Number: 5,847,788
[45] Date of Patent: Dec. 8, 1998

[54] OPTICAL INFORMATION PROCESSOR

[75] Inventor: Nobuyuki Hashimoto, Tokorozawa, Japan

[73] Assignee: Citizen Watch Co., Ltd., Tokyo, Japan

[21] Appl. No.: 646,142

[22] Filed: May 7, 1996

[30] Foreign Application Priority Data

May 16, 1995 [JP] Japan ..................................... 7-116699

[51] Int. Cl.⁶ .......................... G02F 1/1335; G02F 1/133; G02F 1/13

[52] U.S. Cl. ................................ 349/99; 349/17; 349/116; 349/201

[58] Field of Search ............................... 349/17, 99, 201, 349/116

[56] References Cited

U.S. PATENT DOCUMENTS

| | | | |
|---|---|---|---|
| 4,813,761 | 3/1989 | Davis et al. | 349/201 |
| 5,132,811 | 7/1992 | Iwaki et al. | 349/17 |
| 5,581,383 | 12/1996 | Reichel et al. | 349/116 |

OTHER PUBLICATIONS

Aris Tanone et al., Effects of thresholding in joint–transform correlation, Applied Optics, vol. 31, No. 23, Aug. 10, 1992, pp. 4816–4822.

Nobuyuki Hashimoto et al., "Real–time electroholographic system using liquid crystal television spatial light modulators", Journal of Electronic Imaging, Apr. 1993, vol. 2(2), pp. 93–99.

Primary Examiner—William L. Sikes
Assistant Examiner—Julie Ngo
Attorney, Agent, or Firm—Armstrong, Westerman, Hattori, McLeland, & Naughton

[57] ABSTRACT

An optical information processor according to the present invention comprises a spatial light modulator 1 illuminated by linearly polarized coherent light and a linear polarization detector element 2 for detecting light diffracted by the spatial light modulator 1, wherein a rotatory polarization element of the spatial light modulator 1 is arranged in such a manner that the direction of the major molecular axis 11 thereof at the incident light side substantially conforms to the linear polarization axis direction (Y-axis direction) of the coherent light and the linear polarization detector element 2 is arranged in such a manner that the detecting axis 21 thereof crosses substantially at right angles with the major polarization axis of the zero-order diffracted light 4 included in the diffracted light described above. As a result, it is possible to effectively reduce the zero-order diffracted light component which is not modulated by the spatial light modulator without increasing the entire length of the optical system so much and without requiring excessive electric circuit or processing time.

16 Claims, 7 Drawing Sheets

OPTICAL INFORMATION PROCESSOR

BACKGROUND OF THE INVENTION

1. Field of the Invention

The present invention relates to an optical information processor for optically processing information by use of a spatial light modulator composed of a rotatory polarization element (device) as a diffraction optical modulator element.

2. Description of the Prior Art

There is known an optical information processor for displaying a diffraction grating such as a hologram on a spatial light modulator composed of a rotatory polarization element such as a liquid crystal element, etc., and for modulating light waves to perform an optical operation such as pattern recognition, three-dimensional display, optical scanning etc.

In such an optical information processor, a zero-order diffracted light component which is not modulated by the spatial light modulator becomes a noise component, which deteriorates the optical operating function of the processor.

Accordingly, in order to reduce the zero-order diffracted light component, a spatial frequency filtering optical system composed of a lens and a filter mask is provided behind the spatial light modulator to remove the zero-order diffracted light component. Alternatively, in case of an apparatus for photographing the diffracted light by an electronic camera, etc., a technique of electrically removing a zero-order diffracted light signal from photographed image data is employed.

However, there occurs the following problems when the spatial frequency filtering optical system is employed. That is, an entire length of the optical system is not only increased unnecessarily, but also when the zero-order diffracted light spreads wide, the spatial frequency filtering optical system cannot filter such diffraction light, and further, it is difficult to position the filter mask. When the zero-order diffracted light is removed electrically, an additional electric circuit is needed, which requires additional processing time. Moreover, there is the problem that an output of an image sensor of the electronic camera is sometimes saturated, if the intensity of the zero-order diffracted light is strong.

Whereupon, the principle of such a spatial light modulator is described now by exemplifying a spatial optical modulation using a 90-degree twisted nematic liquid crystal element that is a typical rotatory polarization element having the function of rotatory polarization power for rotating a plane of polarization of light with reference to FIGS. 9 and 10.

In FIG. 9, incident linearly polarized light 101 (the direction of linear polarization axis is denoted by an arrow) which is linearly polarized in a Y-axis direction is incident on a liquid crystal element 103. The major molecular axes of liquid crystal molecules 105 in the liquid crystal element 103 are smoothly turned counterclockwise in a Z-axis direction that is, in the optical axis of the liquid crystal element 103, up to 90 degrees. The liquid crystal element 103 is a 90-degree twisted nematic liquid crystal element that is a rotatory polarization element used as the spatial light modulator.

At this time, if the major axes of the liquid crystal molecules 105 on the surface 103a of the liquid crystal element 103 at the side of the incident linearly polarized light 101 (hereinafter referred to as incident linearly polarized light side surface 103a) are oriented in the Y-axis direction, the incident linearly polarized light 101 travels through the liquid crystal element 103 while oscillating along the major axes of the liquid crystal molecules 105, the major axis being turned as the light 101 travels, so that a linearly polarized light 107 (the direction of the linear polarization axis is denoted by an arrow) which is linearly polarized in the X-axis direction is emitted from the liquid crystal element 103, as is well known.

Accordingly, supposing that the thickness of the liquid crystal layer in the liquid crystal element 103 in a Z-axis direction is d and the refractive index of the liquid crystal molecules 105 in the major axis directions thereof is $n_1$, the incident linearly polarized light 101 travels an optical path of $d \times n_1$ to be emitted from the liquid crystal element 103 as the linearly polarized light 107.

As shown in FIG. 10, when a sufficiently high voltage is applied between the incident linear polarization light side surface 103a of the liquid crystal element 103 and the emitted light side surface 103b thereof in the Z-axis direction from an electric power supply (E.P.S.) 109, the major molecular axes of all the liquid crystal molecules 105 are oriented in the direction of electric field which is generated by the voltage (a direction parallel to the Z-axis direction) instead of being turned as described above.

In this state, the polarization direction of the incident linearly polarized light 101 and that of the emitted linearly polarized light 107' are the same, i.e. the Y-axis direction. At this time, supposing that the refractive index of the liquid crystal molecules 105 in the minor axis directions thereof is $n_2$, the incident linearly polarized light 101 travels the optical path of $d \times n_2$ to be emitted from the liquid crystal element 103 as the emitted linearly polarized light 107'.

Meanwhile, a relative optical path difference δ and a relative phase difference Φ between the emitted linearly polarized light 107 and 107' shown in FIGS. 9 and 10 respectively are given by the following expression, supposing that the wavelength of the incident linearly polarized light 101 is λ.

$$\delta = (n_1 - n_2)d \quad (1)$$

$$\Phi = \delta/\lambda \quad (2)$$

Further, it is also possible to turn the polarization axis of the incident linearly polarized light 101 from the Y-axis direction toward the X-axis direction by a proper angle by appropriately adjusting the voltage applied to the liquid crystal element 103 in the Z-axis direction. However, in order to simplify the description, here we assume only the two binarized states described above.

FIG. 11 shows a basic structure of an apparatus for removing the zero-order diffracted light using a conventional spatial frequency filtering optical system.

The apparatus comprises a spatial light modulator 203 made of the liquid crystal element set forth above, etc., a lens 209 (convex lens) and a filter mask 213, which constitute the spatial frequency filtering optical system.

The spatial light modulator 203 is illuminated by a parallel laser beam 201 that is coherent light. Zero-order diffracted light 205 emitted from the spatial light modulator 203 goes straight on to be incident on the lens 209 parallel with the optical axis thereof, and first-order diffraction light 207 that is signal light is incident on the lens 209 while being inclined by a diffraction angle φ relative to the zero-order diffracted light 205. As a result, the zero-order diffracted light 205 and the first-order diffracted light 207 are respectively focused on different positions on the focal plane 211 of the lens 209. Then the zero-order diffracted light 205 is removed by a circular filter mask 213 provided on the focal plane 211, the center of the filter mask 213 being on the optical axis of the lens 209.

However, in such an arrangement, the entire length of the optical system is increased unnecessarily as described above. Further, there occurs the problem that the zero-order diffracted light 205 cannot be completely filtered by the filter mask 213 when the zero-order diffracted light 205 widely spreads, and it is also difficult to position the filter mask 213.

SUMMARY OF THE INVENTION

The present invention has been made to solve the aforementioned problems of the prior art optical information processor. It is an object of the present invention to provide an optical information processor capable of effectively reducing a zero-order diffracted light component which is not modulated by a spatial light modulator without increasing an entire length of an optical system so much, and without requiring additional electric circuits or processing time.

Accordingly, the optical information processor according to the present invention is composed of a spatial light modulator formed of a rotatory polarization element which is illuminated by linearly polarized coherent light and a linear polarization detector element for detecting light diffracted by the spatial light modulator, wherein the rotatory polarization element is arranged in such a manner that the major axis directions of liquid crystal molecules at the incident light side thereof substantially conform to the linear polarization axis direction of the coherent light (within a deviation range of ±5°) while the linear polarization detector element is arranged in such a manner that the detecting axis thereof crosses substantially at right angles with the major polarization axis of a zero-order diffracted light component included in the diffracted light (within a deviation range of ±5°).

Solid crystal elements such as a lithium tantalate crystal, a lithium niobate crystal etc., ceramic elements and various kinds of liquid crystal elements can be used as the rotatory polarization element set forth above, but it is easiest to use an n-degree (generally 90°-degree) twisted nematic liquid crystal element.

When the n-degree twisted nematic liquid crystal element is used as the rotatory polarization element, the linear polarization detector element may be arranged in such a manner that the detecting axis thereof is inclined in a direction opposite to the liquid crystal molecule twisting direction of the twisted nematic liquid crystal element with respect to the major molecular axis thereof at the incident light side substantially by (90-n/2) degrees.

When the coherent light such as a laser beam etc. to illuminate the spatial light modulator is not linearly polarized, a polarization plate may be provided before the spatial light modulator to linearly polarize the coherent light and thereafter illuminate the spatial light modulator by the linearly polarized light.

It is possible to apply the optical information processor described above in various modifications, by varying a signal applied to the spatial light modulator, to a real-time electroholographic system for reproducing a three-dimensional image, a joint Fourier transform correlator for obtaining a correlation signal, a variable focus optics system for shifting the focus of emitted light toward an arbitrary direction, an adaptive optics system for modulating and compensating the wave surface of incident light, an optics system for performing optical beam scanning and the like.

The above and other objects, features and advantages of the invention will be apparent from the following detailed description which is to be read in conjunction with the accompanying drawings.

DETAILED DESCRIPTION OF THE PREFERRED EMBODIMENTS

Optical information processor according to preferred embodiments of the present invention will be now described with reference to drawings.

Figure 1:
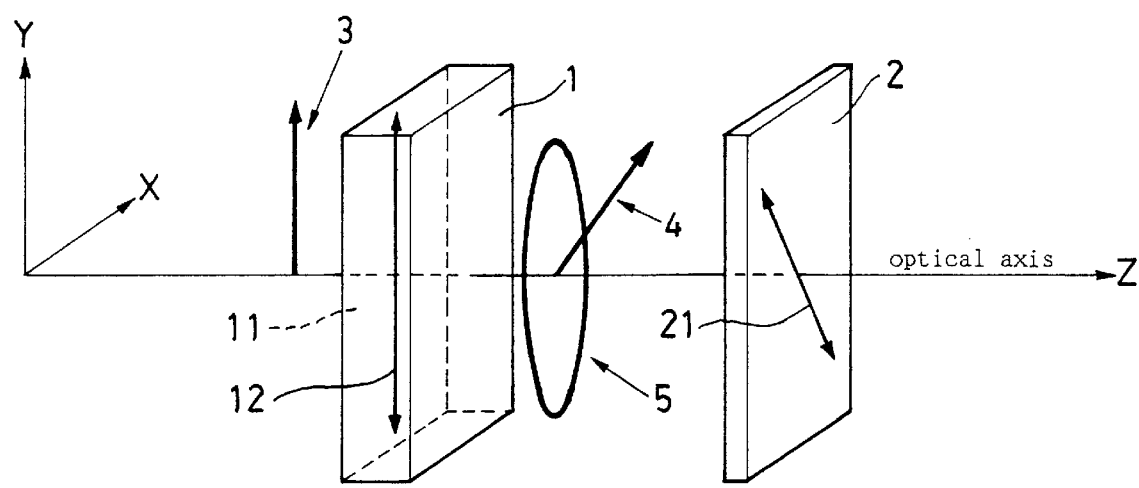
FIG. 1 is a view showing a basic arrangement of an optical information processor for removing a zero-order diffracted light according to the present invention.

FIG. 1 shows an optical information processor of the present invention, i.e. it is a view showing a basic arrangement of an optical information processor for removing zero-order diffracted light using a linear polarization detector element.

This processor is composed of a spatial light modulator 1 and a linear polarization detector element 2, the spatial light modulator 1 and the linear polarization detector element 2 being provided on an optical axis along a Z-axis. It is assumed that a binary grating is displayed on the spatial light modulator 1.

Although the spatial optical modulator 1 and the linear polarization detector element 2 are arranged leaving a space therebetween for the convenience of illustration, the same effect can be obtained even if they substantially contact each other.

A parallel laser beam 3 that is coherent light which is linearly polarized in the Y-axis direction (the direction of the linear polarization axis is denoted by an arrow) is incident on the spatial light modulator 1 to be subjected to optical modulation. The spatial light modulator 1 is composed of a rotatory polarization element such as a liquid crystal element etc. Suppose that the rotatory polarization power (a difference in azimuth angle between the axes of the incident and emitted linearly polarized light in a state where no voltage is applied to the spatial light modulator 1) is θ, the directions of the major molecular axes 12 at the incident light side surface 11 conform to the Y-axis direction which is the same as the linear polarization axis of the parallel laser beam 3.

A light wave which is diffracted and emitted by the spatial light modulator 1 comprises a light wave having a complex amplitude distribution E (Y) which is linearly polarized in the Y-axis direction and a light wave having a complex amplitude distribution E (θ) which is linearly polarized in a direction inclined by θ with respect to the Y-axis direction.

At this time, E (Y) and E (θ) are respectively expressed as follows.

$$E(Y)=E1(Y)+E2(Y)G \quad (3)$$

$$E(\theta)=E3(\theta)+E4(\theta)EXP(i\Phi)G \quad (4)$$

Here E1 and E3 are zero-order diffracted light components, E2 and E4 EXP (iφ) are first-order diffracted light components, Φ is a relative phase difference obtained by the expression (2) described above, i is the imaginary unit, and G is the first-order diffraction component of a grating vector displayed on a spatial light modulator 1. Concretely, it means that the first-order diffracted light is emitted in a direction inclined by a diffraction angle φ with respect to the zero-order diffracted light. Diffracted light components other than the zero-order and first-order diffracted light components are neglected to simplify the explanation.

At this time, the zero-order diffracted light E1 and E3 have no relative phase difference φ therebetween since they have not been subjected to phase modulation. As a result, the sum of the zero-order diffracted light E1 and E3 always becomes linearly polarized light. This is shown as zero-order diffracted light 4 having the major polarization axis, the direction of which is indicated by an arrow in FIG. 1.

On the other hand, since the first-order diffracted light E2 and E4 EXP (iφ) are subjected to phase modulation, there is a relative phase difference φ therebetween, so that the sum generally becomes elliptically polarized light. This is shown as first-order diffracted light 5 in FIG. 1.

Whereupon, when a linear polarization detector element 2 such as a polarization plate is arranged behind the spatial light modulator 1 in such a manner that the detecting axis 21 thereof crosses at right angles with the major polarization axis of the zero-order diffracted light 4, the zero-order diffracted light 4 can be removed. At this time, the first-order diffracted light 5 is attenuated but can be detected by the linear polarization detector element 2 since it is an elliptically polarized light.

If it is merely intended to reduce the influence of the zero-order diffracted light 4 alone, the directions of the major molecular axes 12 of the spatial light modulator 1 at the incident light side surface 11 need not strictly conform to the linear polarization axis of the laser beam 3, an error of about ±5° being allowable. An experiment proved that the effect of reducing the zero-order diffracted light was at a maximum when they differ from each other by 1°~1.5°. Further, the direction of the detection axis 21 of the linear polarization detector element 2 also need not cross strictly at right angles with the major polarization axis of the zero-order diffracted light 4, deviation of about ±5 being allowable too.

Figure 2:
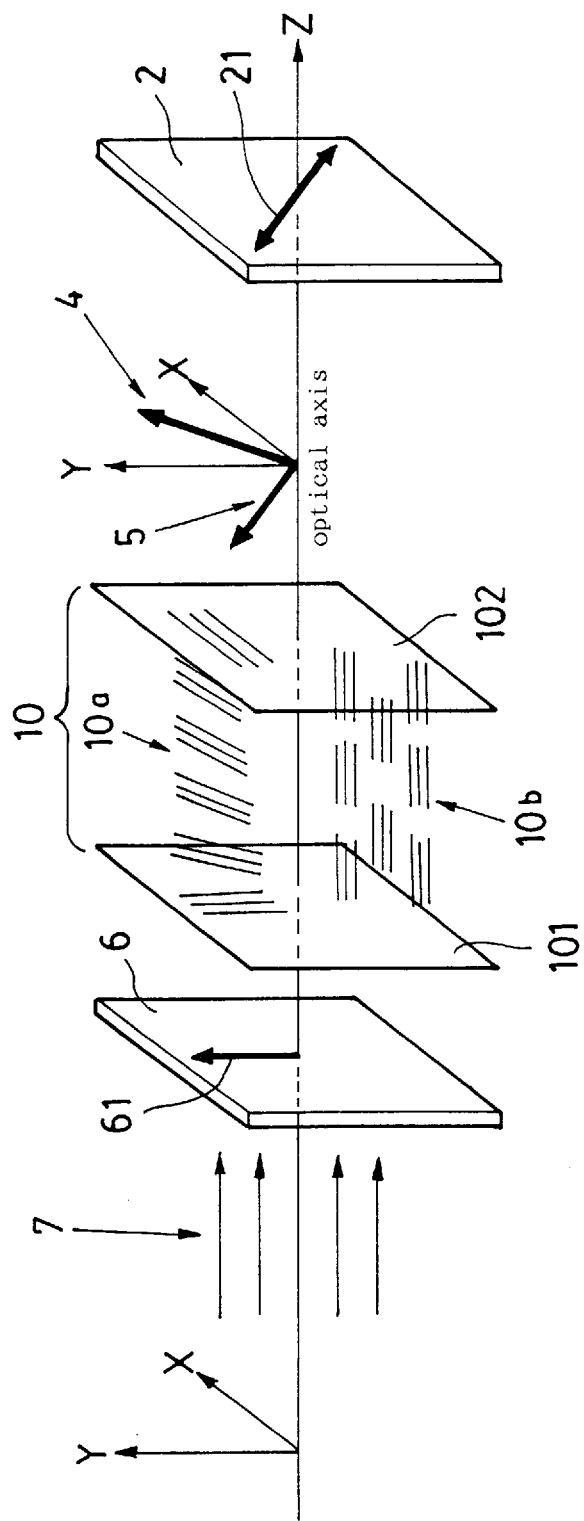
FIG. 2 is a view showing an arrangement of an optical information processor for removing a zero-order diffracted light according to an embodiment of the present invention.

FIG. 2 shows an arrangement of an optical information processor according to a preferred embodiment of the present invention. The processor principally has the same arrangement as that shown in FIG. 1 but employs a 90-degree twisted nematic liquid crystal element as a spatial light modulator 10. Further, a polarization plate 6 is arranged before the incident light side surface 101 of the spatial light modulator 10, the linear polarization axis 61 of the polarization plate 6 substantially conforming to the Y-axis direction.

A parallel laser beam 7 that is coherent light is linearly polarized in the Y-axis direction as it passes through the polarization plate 6 to illuminate the spatial light modulator 10. The twisted nematic liquid crystal element of the spatial light modulator 1 is arranged in such a manner that the orienting directions of the major molecular axes thereof at the incident light side surface 101 substantially conform to the Y-axis direction.

Liquid crystal molecules 10a in the portion of the spatial light modulator 10 to which no voltage is applied are arranged such that the major molecular axes thereof are smoothly turned counterclockwise toward the Z-axis direction up to 90° so as to conform to the X-axis direction on the emitted light side surface 102 as shown in the upper half of FIG. 2.

On the other hand, liquid crystal molecules 10b in the portion of the spatial light modulator 10 to which a voltage is applied are arranged such that the major molecular axes thereof are all oriented toward the direction of electric field generated by the voltage (a direction parallel to the Z-axis) as shown in the lower half of FIG. 2.

At this time, when a signal voltage distributed in accordance with a diffraction grating pattern such as a hologram is applied to the spatial light modulator 10 to subject the same to binarized driving, a light wave having two polarized light components, one having a complex amplitude distribution E (Y) which is linearly polarized in the Y-axis direction and the other having a complex amplitude distribution E (X) which is linearly polarized in the X-axis direction, is emitted from the spatial light modulator 10.

Figure 3:
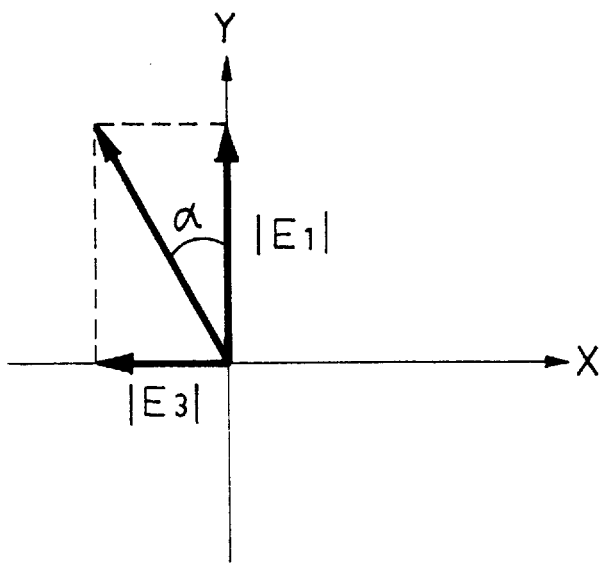
FIG. 3 is a graph showing the polarized state of the zero-order diffracted light produced by the spatial light modulator in FIG. 2.

At this time, the zero-order diffracted light 4 becomes a linearly polarized light as described with reference to FIG. 1. It is understood that the major axis of the linearly polarized light is turned with respect to the Y-axis in the turning direction of the liquid crystal molecules as shown in FIG. 3 by $$\alpha = \tan^{-1}(|E3|/|E1|).$$

Here |E1| and |E3| represent light intensity, whose ratio is varied in response to the distribution of signal voltage applied to the spatial light modulator 10, being normally close to 1:1. It is evident that α=45 degrees (90 degrees/2) is established at this time.

Under this condition, when the wavelength λ of the incident light, the thickness d of the liquid crystal layer, and a refractive index difference ($n_1-n_2$) between the major and minor axes of the liquid crystal molecules are selected so that the relative phase difference φ described above becomes an odd number times as large as π radian, the first-order diffracted light 5 also becomes linearly polarized light, and moreover the major polarization axis thereof crosses at right angles with the major polarization axis of the zero-order diffracted light 4.

Whereupon, when the linear polarization detector element 2 is arranged in such a manner that the detecting axis 21 thereof crosses substantially at right angles with the major polarization axis of the zero-order diffracted light 4, the zero-order diffracted light 4 can be removed and the component of the first-order diffracted light 5 can be completely transmitted.

Figure 4:
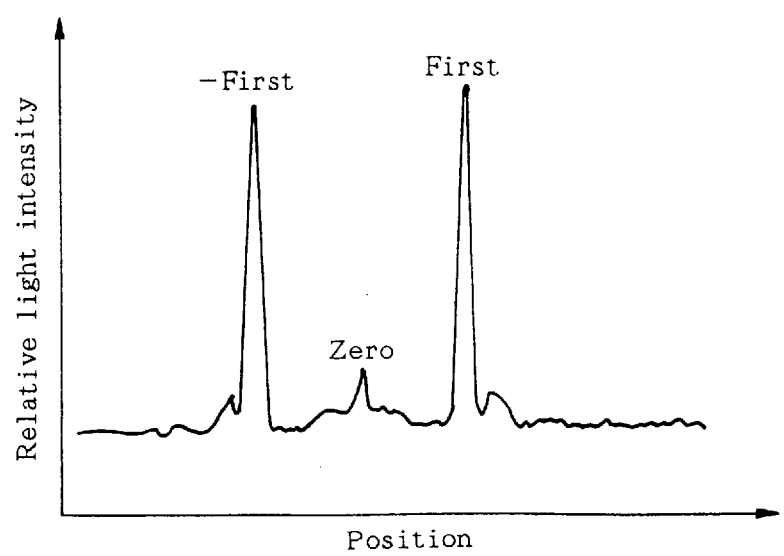
FIG. 4 is a graph of waveform (power spectrum) for explaining the effect of the embodiment shown in FIG. 2.

FIG. 4 shows a waveform (power spectrum) which is obtained by displaying a binary grating on the spatial light modulator 10 using the optical information processor of the preferred embodiment as shown in FIG. 2, then monitoring on an oscilloscope the intensity distribution of the diffracted light received by a CCD image sensor.

Figure 11:
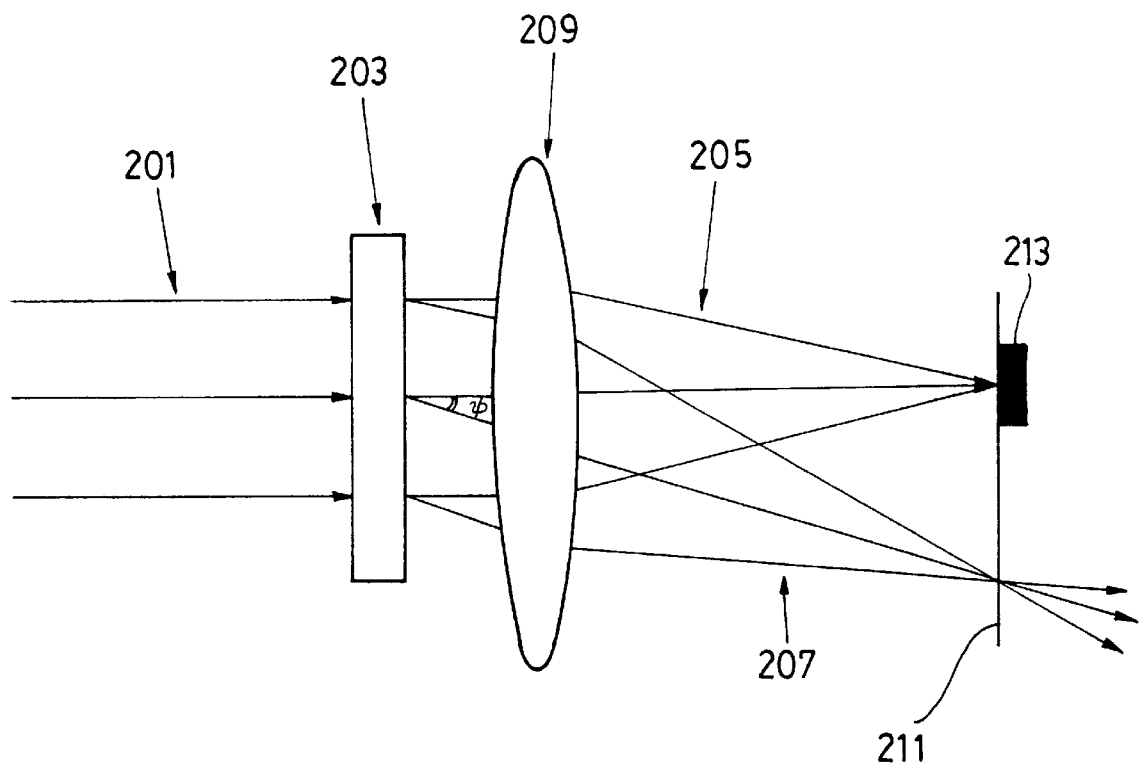
FIG. 11 is a view showing a basic arrangement of an apparatus for removing a zero-order diffracted light using a conventional spatial frequency filtering optical system.

For the convenience of measurement, a lens is disposed behind the spatial light modulator 10, similar as shown in the prior art example of FIG. 11, and diffracted light is observed on the focal plane of the lens. It is evident from the waveform that the zero-order diffracted light component (Zero) shown as a peak at the center is almost removed, being very small compared with the components of the first-order and minus first-order diffracted light (First, -First) at both sides thereof.

In FIG. 2, when the incident parallel laser beam 7 is already linearly polarized coherent light, the polarization plate 6 can be omitted.

Although the binary hologram or the binarized driving of the spatial light modulator were exemplified in order to simplify explanation, a normal hologram or a normal driving system can also obtain a similar effect.

Further, a simple grating pattern was exemplified in the above explanation, but a similar effect can be obtained also in a case where a complicated hologram pattern used for optical operations is displayed on the optical light modulator.

Furthermore, when the n-degree twisted nematic liquid crystal element is employed as the rotatory polarization element, the liquid crystal element may be arranged in such a manner that the direction of the major molecular axes thereof at the incident light side substantially conforms (within a range of ±5°) to the linear polarization axis of the incident coherent light and the linear polarization detector element may be arranged in such a manner that the detecting axis thereof is inclined in a direction opposite to the liquid crystal molecule twisting direction of the liquid crystal element with respect to the major molecular axes thereof at the incident light side substantially by (90−n/2) degrees, i.e., within a range of (90°−n/2)±5° degrees.

This is the case where the ratio in strength between E1 and E2 is 1:1 as described above with reference to FIG. 3, and in case where it is not, the gradient α of the linear polarization axis of the zero-order diffracted light varies (from 45°) as evident from FIG. 3. In that case too, it is possible to remove the zero-order diffracted light by also varying the direction of the detecting axis 21 of the linear polarization detector element 2 shown in FIG. 2 in such a manner that it crosses at right angles with the major polarization axis of the zero-order diffracted light 4.

Other liquid crystal elements (DSM liquid crystal element, DAP liquid crystal element and the like), solid crystal elements such as a lithium tantalate crystal, a lithium niobate crystal etc., or ceramic elements too can be used as the rotatory polarization element constituting the spatial light modulator.

According to the present invention, it is possible to largely reduce the influence of zero-order diffracted light by employing an inexpensive and simple optical arrangement when a spatial light modulator employing such a rotatory polarization element is used as a diffraction light modulator element for a hologram, or the like.

Further, it is also possible to use the zero-order diffracted light reducing means of the present invention together with a conventional spatial frequency filtering means or a means which converts the zero-order diffracted light into an electric signal and thereafter reduces the same.

The optical information processor according to various embodiments of the present invention will be described with reference to FIGS. 5 to 8 hereinafter.

Figure 5:
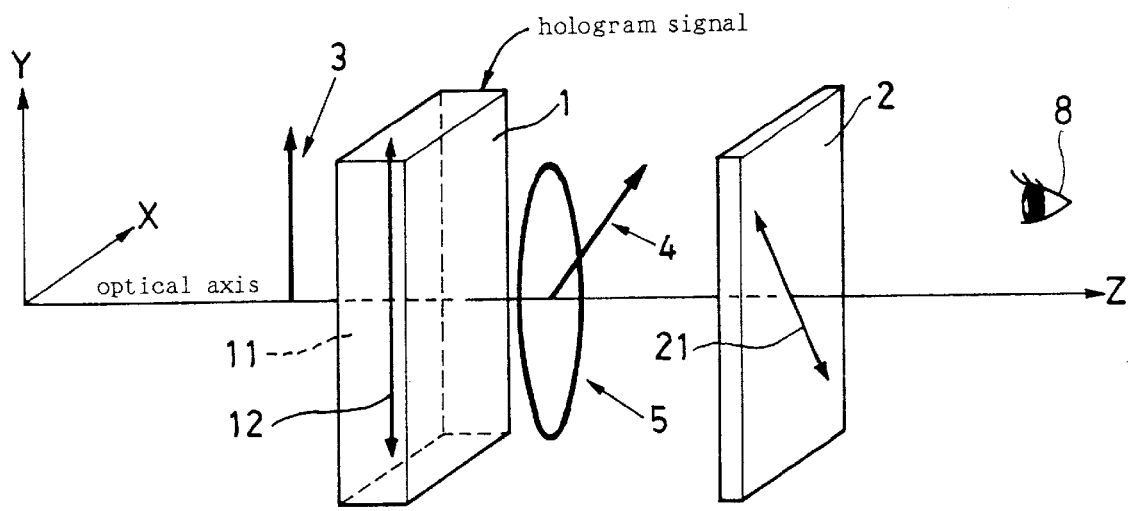
FIG. 5 is a view showing an arrangement of an optical information processor according to an embodiment of the present invention wherein it is applied to a real-time electroholographic system.

FIG. 5 is a view of an optical information processor according to an embodiment of the present invention wherein it is applied to a real-time electroholographic system. The processor of this embodiment is composed of a spatial light modulator 1 and a linear polarization detector element 2 made of a polarization plate, similarly to that of the embodiment shown in FIG. 1. In this case, the spatial light modulator 1 is a liquid crystal display such as a liquid crystal TV.

When a hologram signal photographed by an electronic camera or generated by a computer is applied to the spatial light modulator 1 and the spatial light modulator 1 is illuminated by a linearly polarized laser beam 3, a three-dimensional image is reproduced on the spatial light modulator 1 by the first-order diffracted light 5 that is elliptically polarized light. The three-dimensional image can be seen with human eyes 8 from the emitted light side in the Z-axis direction.

In this case too, since the zero-order diffracted light 4 becomes linearly polarized light, it can be removed by the linear polarization detector element 2 arranged in such a manner that the linear polarization axis 21 thereof crosses substantially at right angles with the major polarization axis of the zero-order diffracted light 4.

Figure 6:
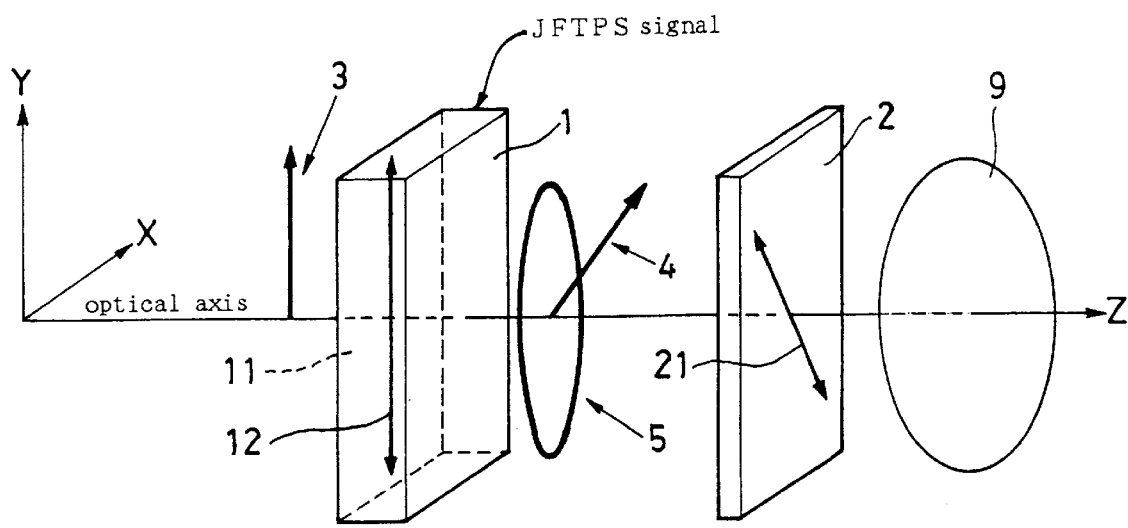
FIG. 6 is a view showing an arrangement of an optical information processor according to an embodiment of the present invention wherein it is applied to a joint Fourier transform correlator.

FIG. 6 is a view of an optical information processor according to an embodiment of the present invention wherein it is applied to a joint Fourier transform correlator. In this embodiment, the optical information processor further comprises a Fourier transformation lens 9 provided on the Z-axis at the emitted light side of the linear polarization detector element 2 added to a spatial light modulator 1 and linear polarization detector element 2 similar to those in FIG. 5.

When a joint Fourier transform power spectral signal (denoted at "JFTPS signal" in the drawing) which is a kind of hologram signal photographed by an electronic camera or generated by a computer is applied to the spatial light modulator 1 and the spatial light modulator 1 is illuminated with a linearly polarized laser beam 3, a joint transform power spectrum is displayed thereon. At this time, the first-order diffracted light 5 that is elliptically polarized light and the zero-order diffracted light 4 that is linearly polarized light are reproduced by the spatial light modulator 1. Further, the first-order diffracted light 5 is subjected to Fourier transformation by way of the Fourier transformation lens 9 so as to obtain a correlation signal on the focal plane of the Fourier transformation lens 9.

In this case too, it is possible to remove the zero-order diffracted light 4 that is a noise component with the linear polarization detector element 2.

Figure 7:
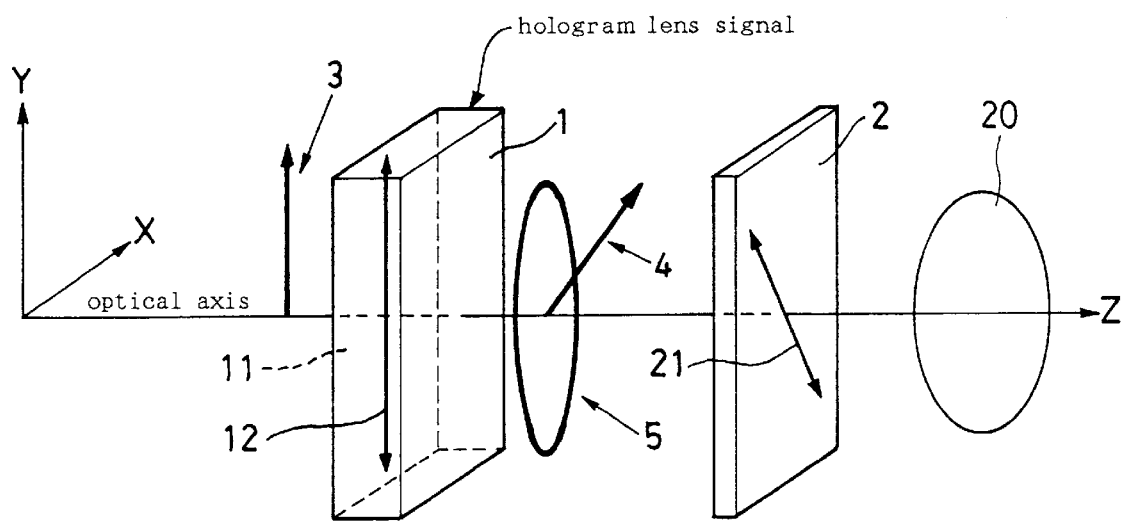
FIG. 7 is a view showing an arrangement of an optical information processor according to an embodiment of the present invention wherein it is applied to a variable focus optics system.

FIG. 7 is a view of an optical information processor according to an embodiment of the present invention wherein it is applied to a variable focus optics system. The processor of this embodiment is similar in structure to that shown in FIG. 5, wherein the first-order diffracted light 5 that is elliptically polarized light and the zero-order diffracted light 4 that is linearly polarized light are reproduced by the spatial light modulator 1 when a hologram lens signal photographed by an electronic camera or generated by a computer is applied to the spatial light modulator 1 and the spatial light modulator 1 is illuminated with the linearly polarized laser beam 3.

The focus of the first-order diffracted light 5 can be shifted in an arbitrary direction with respect to the X, Y and Z axis in response to a hologram lens signal by the hologram lens function of the spatial light modulator 1.

As a result, when information is written in a recording medium 20, e.g., a magneto-optical disc, it is possible to apply the spatial light modulator 1 to an optical pickup to electrically control the same in focusing or tracking.

Also in this case, the zero-order diffracted light 4 that is a noise component can be removed by the linear polarization detector element 2.

Figure 8:
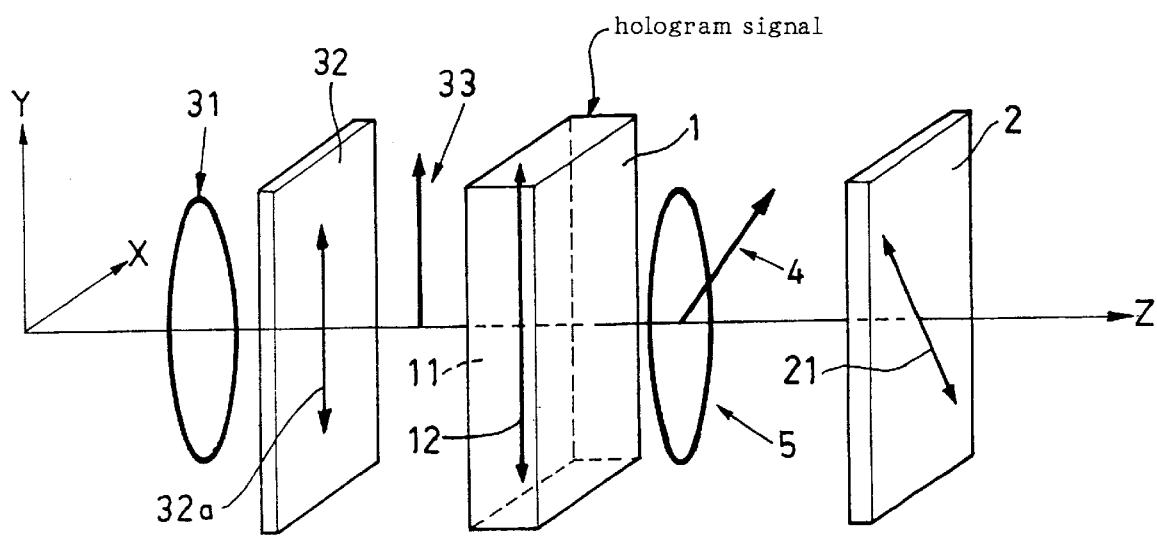
FIG. 8 is a view showing an arrangement of an optical information processor according to an embodiment of the present invention wherein it is applied to an adaptive optics system.
Figure 9:
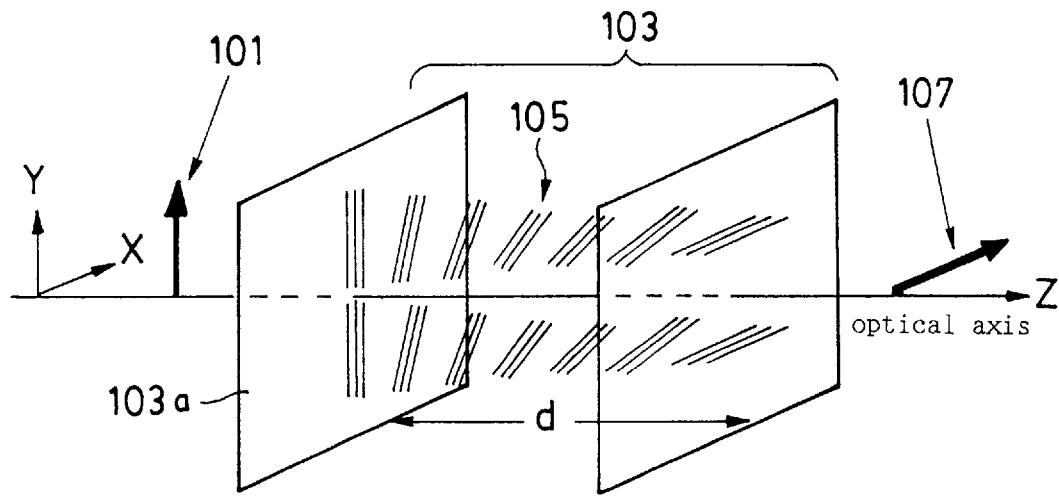
FIG. 9 is a view for explaining the principle of spatial optical modulation using a 90-degree twisted nematic liquid crystal element in a state where no voltage is applied thereto according to a prior art.
Figure 10:
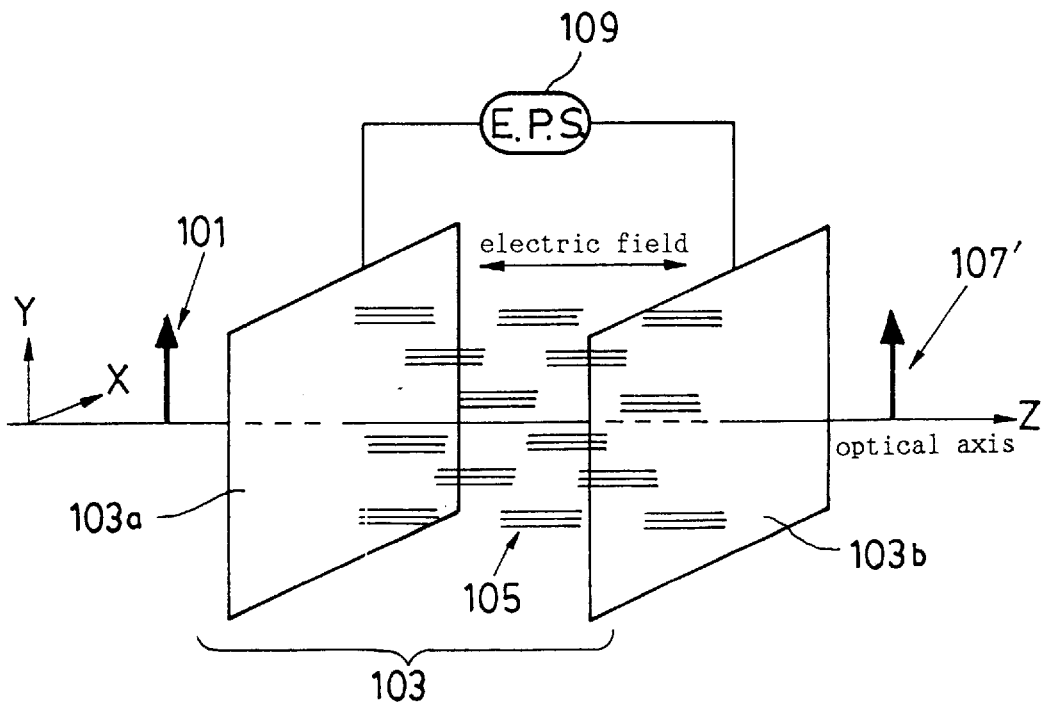
FIG. 10 is a view the same as FIG. 9 in a state where a voltage is applied.

FIG. 8 is a view of an optical information processor according to an embodiment of the present invention wherein it is applied to an adaptive optics system wherein the wave surface of the incident light is modulated for compensation. In this embodiment, a hologram signal generated by a computer is applied to the spatial light modulator 1 to display a hologram thereon. Further, coherent light 31 is converted into linearly polarized light 33 by way of a polarization plate 32 the linear polarization axis 32a of which is arranged to conform to the Y-axis direction and the spatial light modulator 1 is illuminated by the linearly polarized light 33. Then, the spatial light modulator 1 reproduces the first-order diffracted light 5 that is elliptically polarized light and the zero-order diffracted light 4 that is linearly polarized light. At this time, the first-order diffracted light 5 is subjected to phase modulation, so that the incident light is subjected to phase compensation.

For example, when celestial bodies are observed by way of an astronomical telescope, a sufficient enlarging function cannot be obtained since it is influenced by the fluctuation of the atmosphere, but it is possible to remove the influence of the atmosphere by generating a hologram signal in such a way as to cancel the fluctuation of the atmosphere so that the astronomical telescope can display its maximum function.

In this case too, it is possible to remove the zero-order diffracted light 4 that is a noise component by the linear polarization detector element 2.

Although the minus first-order diffracted light has been neglected in the above embodiments, it is known that the generation of the minus first-order diffracted light can be prevented by employing a hologram using an asymmetrically-shaped grating etc. such as a saw tooth grating.

What is claimed is:

1. An optical information processor, comprising:
    a spatial light modulator formed of a rotatory polarization element, having crystal molecules, which is illuminated by linearly polarized coherent light; and
    a linear polarization detector element for detecting light diffracted by the spatial light modulator,
    wherein major axis directions of the crystal molecules at an incident light side of the rotatory polarization element substantially conform to a linear polarization axis direction of the linearly polarized coherent light, while a detecting axis of the linear polarization detector crosses substantially at right angles with a major polarization axis of a zero-order diffracted light component included in the diffracted light, and
    wherein the detecting axis of the linear polarization detector is arranged with a free angle relative to the linear polarization axis direction of the linearly polarized coherent light, not limited to a parallel or a perpendicular relationship.

2. An optical information processor according to claim 1, wherein said rotatory polarization element is a solid crystal element.

3. An optical information processor according to claim 1, wherein said rotatory polarization element is a liquid crystal element.

4. An optical information processor according to claim 3, wherein said liquid crystal element is a 90-degree twisted nematic liquid crystal element.

5. An optical information processor according to claim 1, wherein a hologram signal is applied to the spatial light modulator to reproduce a three-dimensional image.

6. An optical information processor according to claim 1, wherein said processor further comprises a Fourier transform lens for subjecting the first-order diffracted light detected by the linear polarization detector element to a Fourier transform and a joint transform power spectrum signal is applied to the spatial light modulator to display a joint transform power spectrum thereon so that a correlation signal is obtained on a focal plane of the Fourier transform lens.

7. An optical information processor according to claim 1, wherein a hologram lens signal is applied to the spatial light modulator to shift a first-order diffracted light component included in the diffracted light.

8. An optical information processor according to claim 1, wherein a hologram signal for compensation is applied to the spatial light modulator so that the spatial light modulator has an optical compensation function to modulate a wave plane of incident light for compensation.

9. An optical information processor, comprising:
    a spatial light modulator comprising an n-degree (n being an integer) twisted nematic liquid crystal element which is illuminated by linearly polarized coherent light; and
    a linear polarization detector element for detecting light diffracted by the spatial light modulator,
    wherein major axis directions of liquid crystal molecules at an incident light side of the liquid crystal element substantially conform to a direction of a linear polarization axis of the linearly polarized coherent light, while a detecting axis of the linear polarization detector element is inclined in a direction opposite to a liquid crystal molecule twisting direction of said liquid crystal element with respect to the major axes of the liquid crystal molecules at the incident light side substantially by (90-n/2) degrees, and
    wherein the detecting axis of the linear polarization detector is arranged with a free angle relative to the linear polarization axis direction of the linearly polarized coherent light, not limited to a parallel or a perpendicular relationship.

10. An optical information processor according to claim 9, wherein n is 90.

11. An optical information processor, comprising:
    a linear polarization element for linearly polarizing coherent light;
    a spatial light modulator formed of an n-degree (n being an integer) twisted nematic liquid crystal element which is illuminated by the coherent light having traveled through the linear polarization element; and
    a linear polarization detector element for detecting light diffracted by the spatial light modulator,
    wherein major axis directions of liquid crystal molecules at an incident light side of the n-degree twisted nematic liquid crystal element substantially conform to a polarization axis direction of the linear polarization element, while a detecting axis of the linear polarization detector element is inclined in a direction opposite to a liquid crystal molecule twisting direction of said liquid crystal element with respect to the major axes of the liquid crystal molecules at the incident light side substantially by (90-n/2) degrees, and wherein the detecting axis of the linear polarization detector is arranged with a free angle relative to the direction of the polarization axis of the linear polarization element, not limited to a parallel or a perpendicular relationship.

12. An optical information processor according to claim 11, wherein n is 90.

13. An optical information processor, comprising:

a linear polarization element for linearly polarizing coherent light;

a spatial light modulator formed by a rotatory polarization element, having crystal molecules, which is illuminated by the coherent light having traveled through the linear polarization element; and a linear polarization detector element for detecting light diffracted by the spatial light modulator, wherein major axis directions of the crystal molecules at an incident light side of the rotatory polarization element substantially conform to a direction of a polarization axis of the linear polarization element, while a detecting axis of the linear polarization detector crosses substantially at right angles with a major polarization axis of a zero-order diffracted light component included in the diffracted light, and wherein the detecting axis of the linear polarization detector is arranged with a free angle relative to the direction of the polarization axis of the linear polarization element, not limited to a parallel or a perpendicular relationship.

14. An optical information processor according to claim 13, wherein said rotatory polarization element is a solid crystal element.

15. An optical information processor according to claim 13, wherein said rotatory polarization element is a liquid crystal element.

16. An optical information processor according to claim 15, wherein said liquid crystal element is a 90-degree twisted nematic liquid crystal element.

* * * * *